United States Patent [19]
Campbell

[11] 3,722,307
[45] Mar. 27, 1973

[54] APRON DRIVE FOR A MANURE SPREADER
[75] Inventor: Willis R. Campbell, Leola, Pa.
[73] Assignee: Sperry Rand Corporation, New Holland, Pa.
[22] Filed: Nov. 1, 1971
[21] Appl. No.: 194,332

[52] U.S. Cl. ....................................... 74/219, 74/11
[51] Int. Cl. ........................... F16h 7/02, F16h 37/00
[58] Field of Search ............................ 74/11, 219

[56] References Cited

UNITED STATES PATENTS 3,440,890    4/1969    Bornzin ................................. 74/11

FOREIGN PATENTS OR APPLICATIONS 575,858    4/1958    Italy ....................................... 74/11

Primary Examiner—Leonard H. Gerin
Attorney—John C. Thompson, Joseph A. Brown and James J. Kennedy

[57] ABSTRACT

A drive system for a manure spreader having a wagon type body structure with a spreading mechanism mounted transversely the rear thereof and an apron conveyor disposed therein for conveying manure rearwardly into said spreading mechanism. The drive system comprises a propeller shaft mounted on one side of the spreader and having its rearmost end operatively connected to said spreading mechanism through a clutching device. Fixed to and axially spaced on said propeller shaft is a pair of sprockets that are drivingly interconnected to a pair of driven sprockets rotatively journalled on a second drive shaft which is spaced adjacent and extends generally parallel to said propeller shaft and is adapted to drive said apron conveyor. Each of said driven sprockets includes clutch dogs about their inner side which are adapted to engage clutch dogs on the outer sides of a clutch collar keyed to said second drive shaft intermediately between said driven sprockets and slideable therealong for selective engagement with the clutch dogs of the driven sprockets. The clutch collar is actuated by an actuating mechanism that is further operatively connected to said clutching device and particularly adapted to declutch the spreading mechanism without affecting the apron conveyor.

13 Claims, 12 Drawing Figures

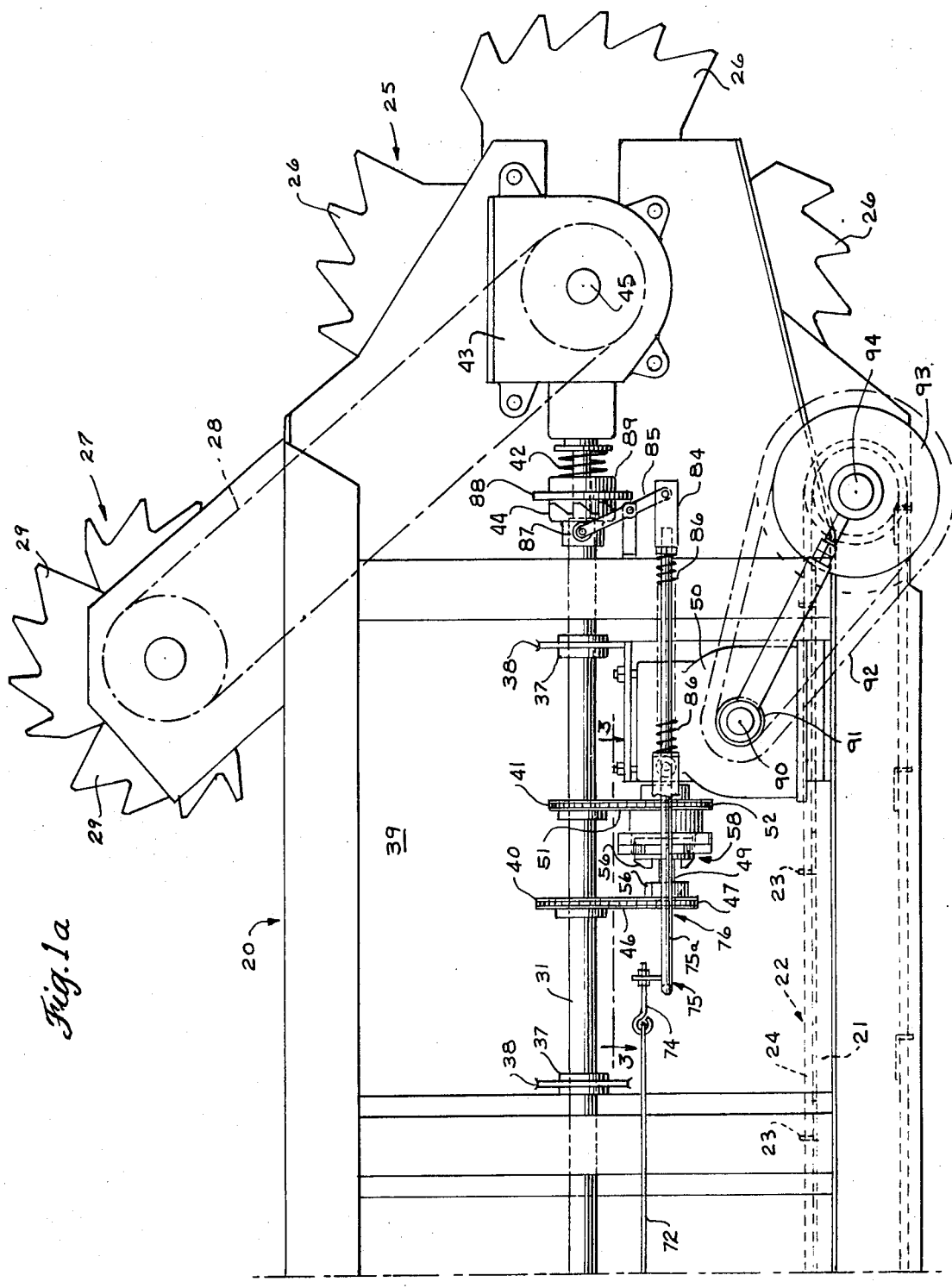

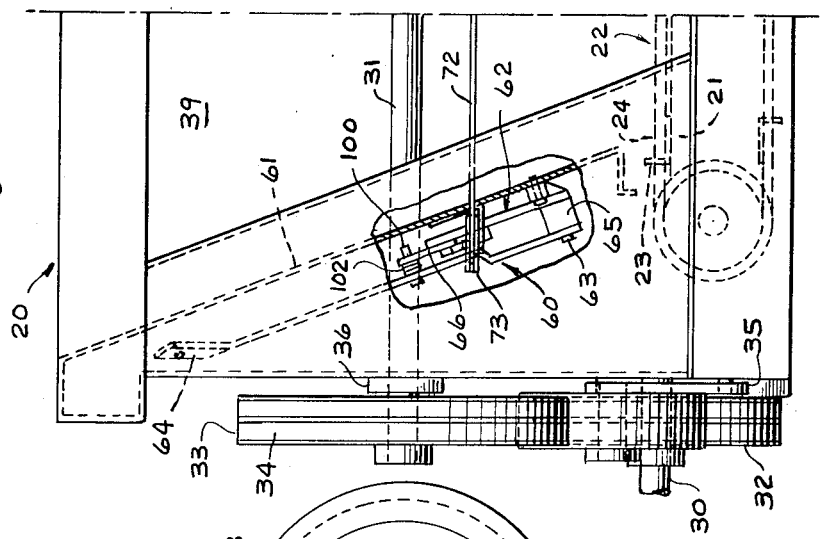
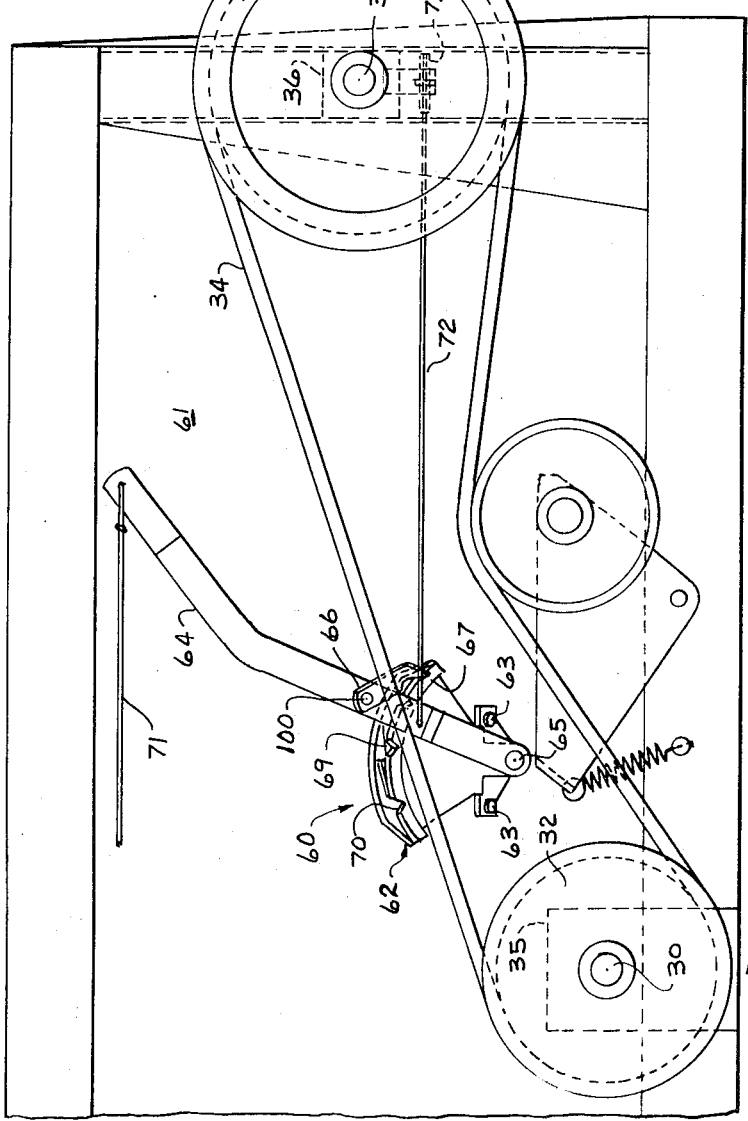

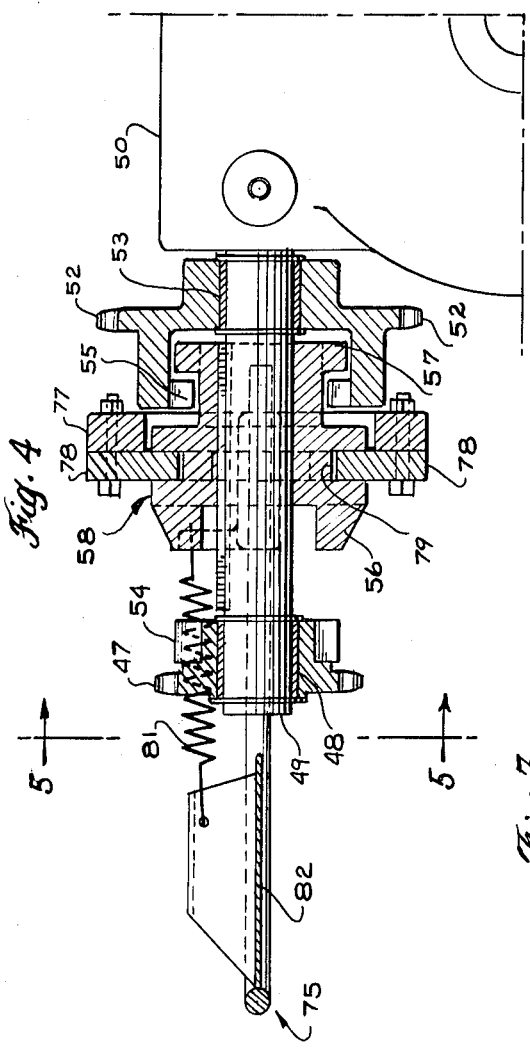
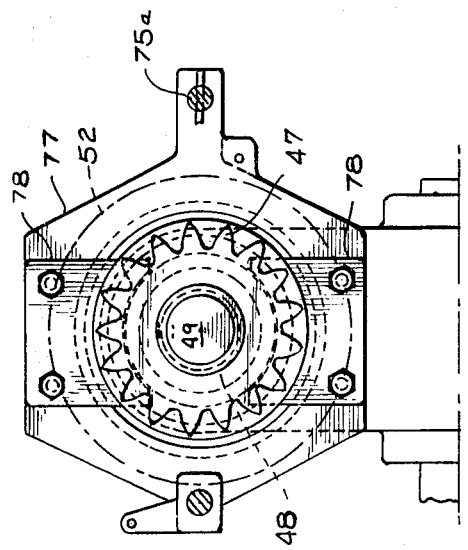
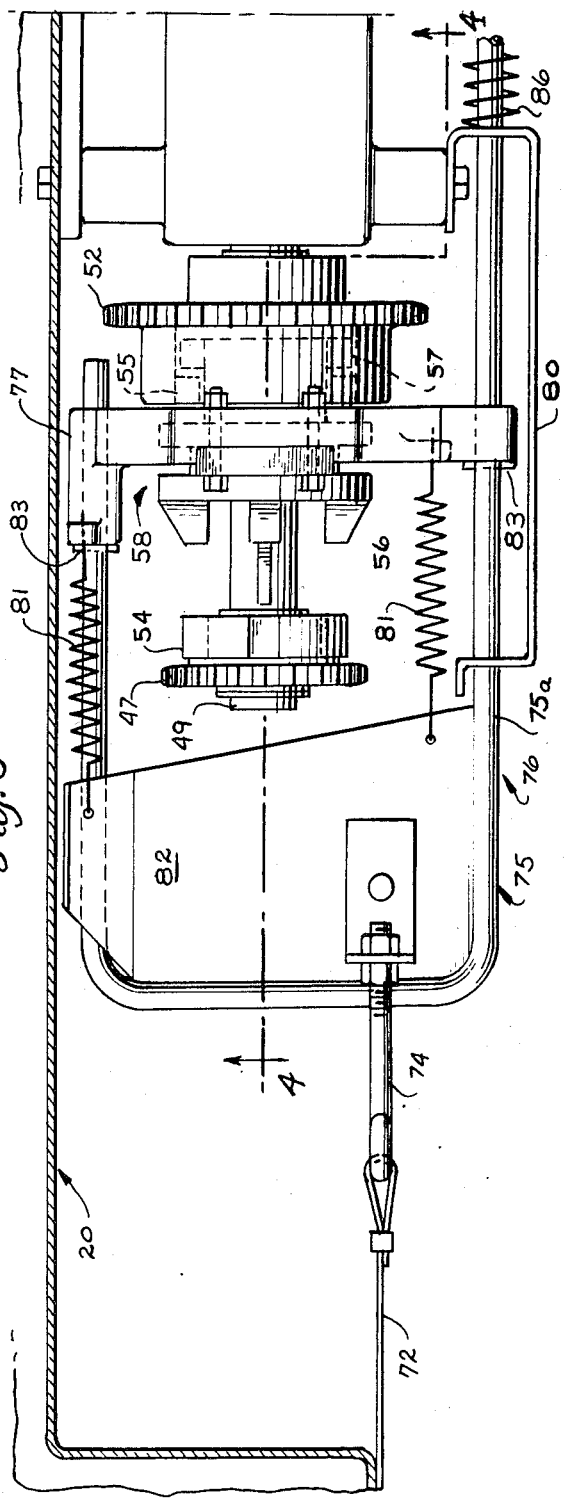

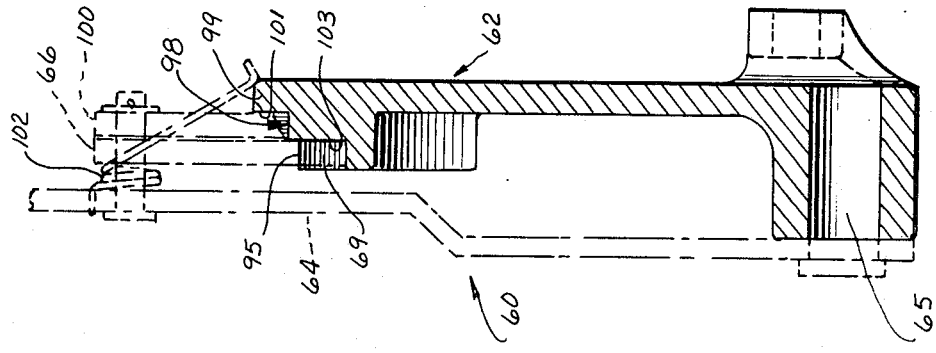
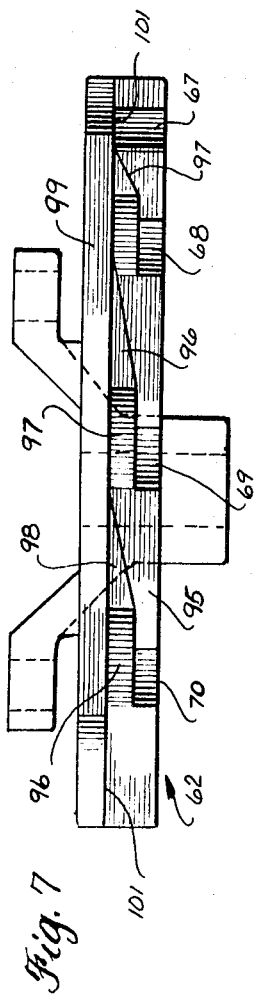
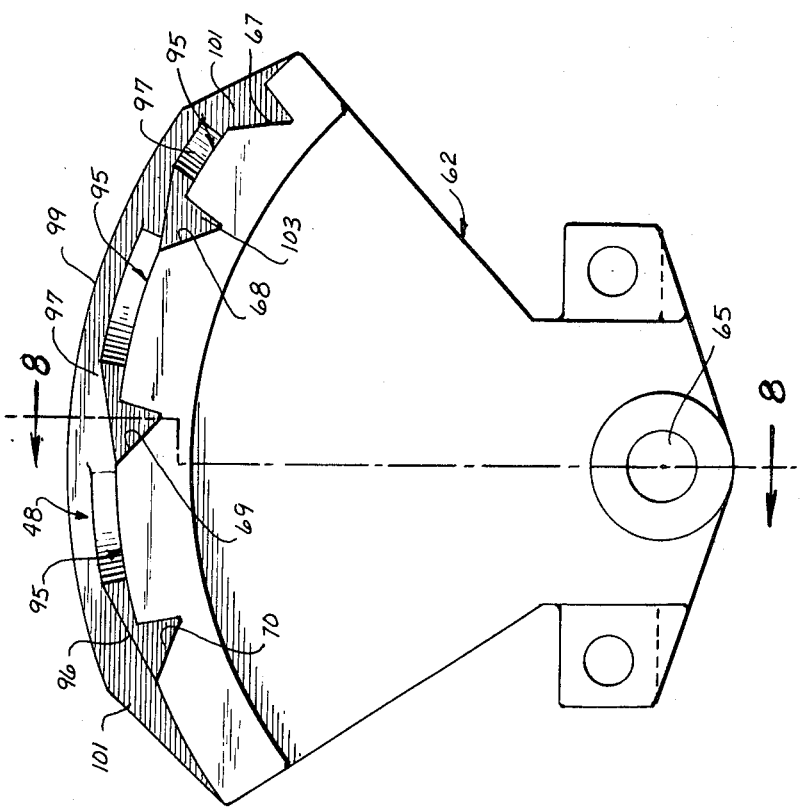

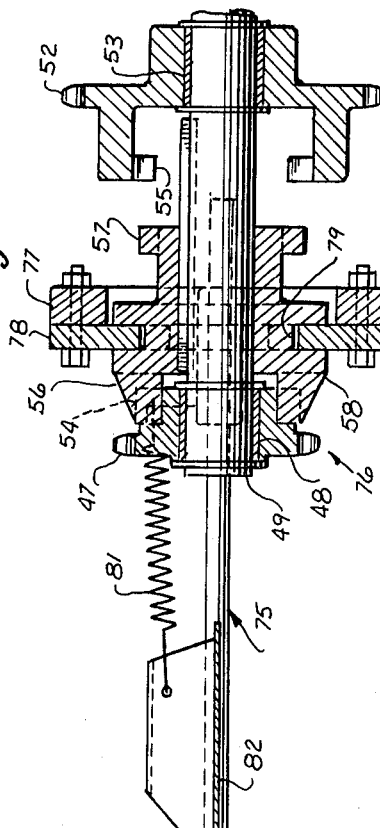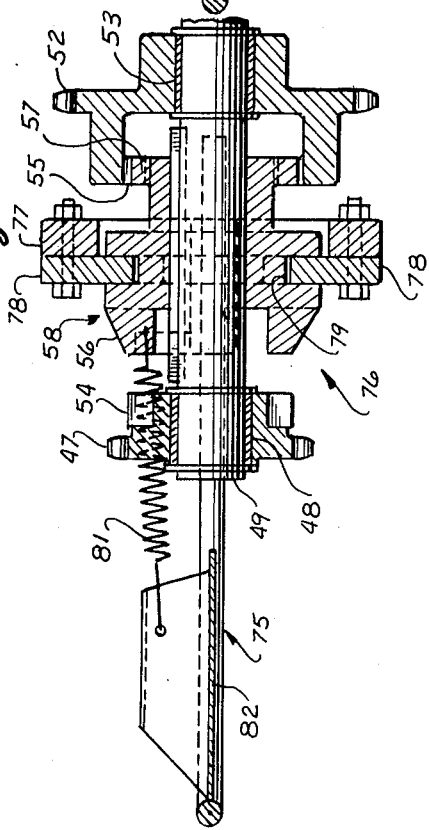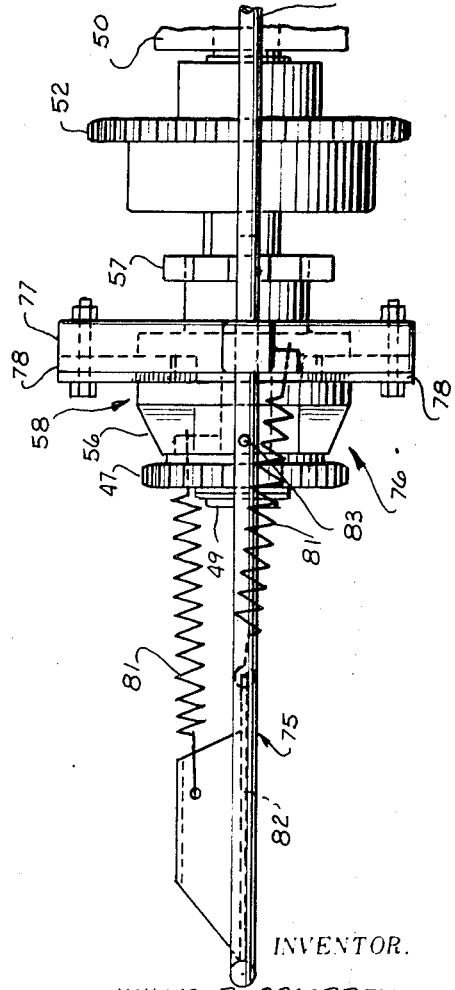

APRON DRIVE FOR A MANURE SPREADER

BACKGROUND OF THE INVENTION

The present invention relates to manure spreaders and more particularly to a drive system for driving the spreading mechanism and apron conveyor thereof.

Conventional manure spreaders generally comprise a wagon type body structure with a rotary spreading mechanism mounted transversely the rear thereof and an apron conveyor disposed therein and particularly adapted to convey manure rearwardly therein into the spreading mechanism which acts to spread the manure generally behind and to the sides of the forwardly traveling manure spreader. In the past many manure spreaders, such as that shown in U.S. Pat. No. 3,358,936 to C. A. Smith, have utilized a ratchet type drive to drive the apron conveyor rearwardly. In such ratchet type drives it will be observed that the manure load is moved rearwardly in small increments as the ratchet wheel only turns a relatively short distance at a time, stops for a period and then once again continues for another short distance. This type of sequence driving gives rise to peak power requirements in order to drive the apron conveyor since the power utilized is only used intermittedly.

Also, it is well appreciated in the art that it is very desirable to be able to control the speed of the apron conveyor between at least two different speeds. In this regard it has been difficult to devise a reliable and dependable means for readily changing the speeds on a ratchet drive.

Therefore, it is the principle object of the present invention to provide a drive system for a manure spreader that utilizes a continuous apron drive component, and furthermore provides means therein for selectively changing the drive speed of the apron conveyor without disrupting the manure spreading operation.

Another object of the present invention is to provide a drive system for a manure spreader that lends itself to a logical farming sequence in that when spreading manure the drive system allows the farmer to (1) begin by driving the spreading mechanism with the apron conveyor in neutral, and (2) shift the drive such that the apron conveyor is driven at a slow speed while continuing to drive the spreading mechanism, (3) shift the drive system such that the apron conveyor is driven at a relatively fast speed while continuing to still drive the spreading mechanism, and (4) to shift the drive system such that the spreading mechanism is declutched and the apron conveyor continues to move at its relatively high speed, thus cleaning out the spreader and completing the spreading operation for that particular load.

A further object of the present invention resides in the provision of a shifting quadrant control that enables the operator to shift quickly and conveniently from one of the above farming sequences to another, and further allows the operator to return to the neutral position where the spreading mechanism is being driven while the apron conveyor is idled from any of the other respective positions.

A more particular object of the present invention resides in the provision of a drive system for a manure spreader that includes a main drive shaft that is operatively connected to said spreading mechanism and a second drive shaft that is drivingly connected to the apron conveyor through a worm drive, and wherein torque is transferred from said main drive shaft to said second drive shaft by two pair of axially spaced sprockets with a pair of these sprockets being rotatively journalled on said second drive shaft and including clutch dogs along the inner sides thereof, and wherein a clutch collar having clutch dogs on opposite outer sides thereof is keyed to said second drive shaft and slideable therealong therebetween said sprockets rotatively journalled thereon, and wherein actuating means is provided to selectively move said clutch collar between the clutch dogs of the two rotative journalled sprockets on said second drive shaft to yield different input speeds to the apron drive.

Another object of the present invention is to provide a clutching device between said main drive and said spreading mechanism, and to further operatively connect said clutching device with said collar actuating means such that said spreading mechanism can be declutched independently of said apron drive.

Other objects and advantages of the present invention will become apparent and obvious from a study of the following description and the accompanying drawings which are merely illustrative of the present invention.

BRIEF DESCRIPTION OF THE DRAWINGS

FIG. 1a is a side elevational view of the rear portion of a manure spreader illustrating apron conveyor and beater drive mechanism constructed in accordance with the invention applied thereto;

FIG. 1b is a similar view of the front portion of the manure spreader illustrating the input drive from the P.T.O. of an associated tractor to the propeller shaft of the apron conveyor and beater drive mechanism;

FIG. 2 is a front view as viewed from the left in FIG. 1b;

FIG. 3 is a plan view on a somewhat enlarged scale, taken as indicated by the arrows 3—3 in FIG. 1a;

FIG. 4 is a longitudinal section taken on the line 4—4 in FIG. 3;

FIG. 5 is a cross section taken on the line 5—5 of FIG. 4;

FIG. 6 is a detail view of the quadrant appearing in FIG. 2;

FIG. 7 is a plan view of FIG. 6;

FIG. 8 is a cross section taken on the line 8—8 in FIG. 6 with an associated control lever and pawl indicated in dot and dash lines;

FIG. 9 is a longitudinal section similar to FIG. 4 but showing the parts in another operating position;

FIG. 10 is a similar longitudinal section showing the parts in still another operating position; and FIG. 11 is an elevational view showing the parts in still another operating position.

Referring to the drawings it will be seen that FIGS. 1a and 1b taken together illustrate the rear and front portions of a manure spreader comprising in general a load carrying wagon body 20 having a floor 21, a floor conveyor apron 22 having longitudinally spaced slats 23 carried by side chains 24 driven in a direction to move manure along the wagon from the front to the rear; a main lower beater unit 25 at the rear open end of the wagon body having a plurality of scattering blades 26 and an upper beater unit 27, driven from the beater unit 25 by a drive chain 28, and having a plurality of scattering blades 29. The manure spreader as just described is of conventional well known form.

The present invention is primarily concerned with the manner of driving and controlling the conveyor apron 22 and the beater units 25 and 27 now to be fully described.

Referring particularly to FIGS. 1a, 1b, 2 and 3 drive is transmitted from a drive shaft 30 connected in known manner to the P.T.O. of an associated tractor (not shown), to a propeller shaft 31 by means of a drive sheave 32 secured on the drive shaft 30, a driven sheave 33 secured on the propeller shaft 31, and a drive belt 34. The drive shaft 30 and propeller shaft 31 are rotatably mounted in suitable bearings 35 and 36 at the front of the wagon body 20 (FIG. 1b and 2).

The propeller shaft 31 extends longitudinally from the front of the wagon body 20 to the rear thereof as clearly shown in FIGS. 1b and 1a. Bearings 37 for the propeller shaft, carried by brackets 38 of the wagon side wall 39, are provided at spaced intervals along the shaft (FIG. 1a). Toward its rear the propeller shaft has secured thereon longitudinally spaced drive sprockets 40 and 41, the sprocket 40 being of larger diameter than the sprocket 41. The rear end of the propeller shaft is drivingly connected to the input shaft 42 of a right angle gearbox 43 by means of a known overriding clutch 44. The output shaft 45 of the gearbox 43 drives the beater unit 25. Thus when the clutch 44 is engaged as shown in FIG. 1a the beater units are driven.

The drive sprocket 40 of the propeller shaft is drivingly connected by a drive chain 46 to a sprocket 47 mounted by a bearing sleeve 48 for free rotation on the input shaft 49 of a worm gear unit 50 and the drive sprocket 41 of the propeller shaft is drivingly connected by a drive chain 51 to a sprocket 52 mounted by a bearing sleeve 53 for free rotation on the input shaft 49 of the gear unit 50.

The sprocket 47 is provided with clutch dogs 54 and sprocket 52 is provided with internal clutch dogs 55 which dogs 54 and 55 are adapted to be selectively engaged by the clutch dogs 56 and 57 of a clutch collar 58 slidingly keyed on the input shaft 49 of the gear unit 50.

The clutch collar 58 is adapted to be shifted to various operative positions by means of a quadrant lever device 60 mounted on the front wall 61 of the wagon body 20 as shown in FIGS. 1b and 2. The device 60 comprises a quadrant 62 secured by bolts 63, to the front wall 61, a control lever 62 pivoted on the quadrant at 65, and a spring loaded pawl 66 cooperating with spaced notches 67, 68, 69 and 70 of the quadrant 62. A control rope 71 extends from the control lever 64 to a point within reach of the operator.

An actuating cable 72 (FIGS. 1b, 2, 1a and 3) leads from the control lever 64 over a corner pulley 73 to an adjustable eye bolt 74 carried by a U-shaped shifter rod 75 of a shifter device 76 for the clutch collar 58. The shifter device comprises a shifter yoke 77 mounted on the U-shaped shifter rod 75 and having a pair of shifter plates 78, 78 secured thereto which fit into an annular groove 79 in the clutch collar 58; a fixed guide bracket 80 for the rods 75; and tension springs 81, 81 connected at one end to the yoke and at their other ends to a web plate 82 of the U-shaped shifter rod 75 which act to maintain the yoke in contact with stop pins 83, 83 of the rod 75 as shown in FIG. 3.

Referring to FIGS. 1a, 3 and 11 it will be seen that the front leg 75a of the U-shaped rod 75 extends rearwardly and is connected by a clevis 84 to the lower end of a pivoted actuating lever 85 for the clutch 44. A compression spring 86 carried by the leg 75a and positioned between the fixed bracket 80 and the clevis 84 normally maintains the roller 87 of the actuating lever 85 out of contact with the flange 88 of the shiftable member 89 of the clutch 44. The spring 86 also acts to hold tension against the control lever 64 rearwardly and to return it to starting or neutral position (FIG. 2). This spring also holds the pawl 66 against the quadrant notches.

Referring to FIG. 2 it will be seen that the control lever 64 has been shifted to a position in which the pawl 66 is engaged in the first notch 67 of the quadrant and that with the control lever in this position the clutch collar 58 has been shifted to a position in which its dogs 56 are disengaged from the dogs 54 of sprocket 47 and in which its dogs 57 are disengaged from the internal dogs 55 of sprocket 52 (FIG. 4). Thus both sprockets 47 and 52 rotate idly on the input shaft 49 and no drive is imparted to the gear unit 50.

The output shaft 90 of the gear unit 50 has a sprocket 91 secured thereon which is connected by a drive chain 92 to a sprocket 93 secured on the drive shaft 94 of the apron conveyor 22. Since no drive is being transmitted to the gear unit 50, as mentioned above, the apron conveyor remains idle. It is noted however that with the control lever in the position of FIG. 2 the actuating lever 85 of the clutch 44 has not disengaged the clutch and thereof the beater units are running.

When the control lever 64 is shifted to the left to engage its pawl in the second notch 68 of the quadrant the clutch collar 58 is shifted to the left an amount to engage its dogs 57 with the internal 55 of sprocket 52 as shown in FIG. 9. In this position the dogs 56 of the clutch collar are still disengaged from the dogs 54 of sprocket 47. It is also pointed out that in this position the actuating lever 85 of clutch 44 has not moved enough to disengage the clutch and therefore the beaters are still running. Further it is pointed out that the driven sprocket 52 is of larger diameter than its drive sprocket 41 and therefore the apron conveyor 22 is driven at a slow speed.

When the control lever 64 is shifted further to the left to engage its pawl in the third notch 69 of the quadrant the clutch collar 58 is shifted further to the left an amount to engage its dogs 67 with the dogs 54 of sprocket 47 and to disengage its dogs 57 from the internal dogs 55 and since the driven sprocket 47 is of smaller diameter than its drive sprocket 40 the apron conveyor 22 is driven at a faster speed. In this position the actuating lever 85 of clutch 44 still has not moved enough to disengage the clutch and therefore the beaters are still running.

When the control lever 64 is shifted further to the left to engage its pawl in the fourth notch 70 of the quadrant the sprocket 47 remains engaged and the apron conveyor continues to run at its fast speed but the U-shaped shifter rod 75 moves to the left and the stop pins 83 move away from the shifter yoke 77 as clearly seen in FIG. 11. This movement of the shifter rod rocks the actuating lever 85 in a direction to cause disengagement of the clutch 44 thus stopping the beater units.

Reverting now to the quadrant lever device 60 illustrated in detail in FIGS. 1b, 2, 6, 7 and 8 it will be seen that the quadrant 62 is provided with the four pawl notches 67, 68, 69 and 70 in the left hand curved portion 95 of FIG. 8 and is provided with angular surfaces 96 and 97 in the adjacent stepped up curved portion 98 and with an upright flange 99 adjacent the curved portion 98. The pawl 66 is pivoted on the control lever 64 at 100 and when the control lever is in the position of FIG. 2 the pawl is firmly seated in the notch 67 and against the side face 101 of the flange 99 by means of a combined torsion and tension spring 102.

When the control lever is moved from this position to the position in which the pawl engages the 2nd notch 68 the pawl first rides along the inclined surface 97 to shift the pawl laterally to ride on the curved surface 95 and then the pawl snaps into and against the face 103 of the notch 68, under influence of the spring. When moving the control lever to engage the third and fourth notches 69 and 70 the pawl action is as just described.

Assuming now that it is desired to disengage the pawl from the fourth notch 70 and to return the control lever to its neutral position, then the lever is first moved to the left to raise the pawl out of the notch and then the pawl first shifts laterally against the face 101 of the flange 99 then rides up the incline surface 96 and onto the curved surface 98 so as to by-pass the notch 70. Similarly the pawl by-passes the notches 69 and 68 and finally it seats in the neutral position notch 67. In this connection it will be further observed that the control lever 64 is always being urged toward neutral position by the spring 86 and therefore when the pawl is released from a notch the control lever will return to its neutral position by reason of the above novel construction of the quadrant lever device 60.

The terms, "upper," "lower," "forward," "rearward" etc. have been used herein merely for the convenience of the foregoing specification and in the appended claims to describe the apron drive for a manure spreader and its parts as oriented in the drawings. It is to be understood, however, that these terms are in no way limiting to the invention since the apron drive for a manure spreader may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Having thus described my invention, what I claim is:

1. A manure spreader having a wagon type body structure with front and side walls, a spreading mechanism rotatively mounted transversely the rear of said wagon, an endless apron conveyor disposed within said wagon for conveying manure rearwardly to said spreading mechanism, and a drive system for driving said spreading mechanism and said apron conveyor simultaneously or independently of each other, said drive system comprising in combination:

a. a main drive shaft rotatively mounted to said wagon body structure;
   b. a clutching device interconnecting said main drive shaft with said spreading mechanism for driving the latter;
   c. a second drive shaft disposed adjacent said main drive shaft and operatively connected to said apron conveyor for driving the same;
   d. a pair of axially spaced drive sprockets fixed to said main drive shaft;
   e. a pair of axially spaced driven sprockets bearinged around said second drive shaft, said driven sprockets having gear teeth associated therewith;
   f. means for drivingly interconnecting respective sprockets on said main drive shaft with the driven sprockets of said second drive shaft;
   g. a driving gear keyed to said second drive shaft generally intermediately between said driven sprockets and slideable along the longitudinal axis thereof, said driving gear having gear means thereon for engagement with the gear teeth associated with each of said driven sprockets for driving said second shaft and said apron drive;
   h. actuating means operatively connected to said driving gear for moving the same from a neutral nonengaged position to a driving engagement position with the gear teeth of either of said driven sprockets; and
   i. a linkage structure interconnecting said actuating means with said clutching device for selectively clutching and declutching said spreading mechanism relative to the position of said driving gear.

2. A manure spreader, as recited in claim 1, wherein the gear teeth associated with said driven sprockets are disposed on the inner sides thereof, and wherein the gear means on said driving gear includes first and second sets of gears disposed on outer opposite sides of said driving gear for selective engagement with the gear teeth of an adjacent driven sprocket.

3. A manure spreader, as recited in claim 2, wherein said actuating means comprises:

a. a yoke secured to said driving gear;
   b. a support member disposed adjacent said spreader for supporting said yoke; and
   c. an actuating link fixed to said support member and extending therefrom for convenient operator access.

4. A manure spreader, as recited in claim 3, wherein said support member is operatively connected to said linkage structure interconnecting said actuating means with said clutching device; and wherein spring means is interconnected between said yoke and said support, allowing said support member to actuate said clutching device independently of said yoke and driving gear.

5. A manure spreader, as recited in claim 4, wherein said support member includes a generally U-shaped rod and wherein said yoke is slideably mounted thereon.

6. A manure spreader having a wagon type body structure with front and side walls, a spreading mechanism rotatively mounted transversely the rear of said wagon, and endless apron conveyor disposed within said wagon for conveying manure rearwardly to said spreading mechanism, and a drive system for driving said spreading mechanism and said apron conveyor simultaneously or independently of each other, said drive system comprising in combination:
- a. a main drive shaft rotatively mounted to said wagon body structure and operative to drive said spreading mechanism;
- b. a second drive shaft disposed adjacent said main drive shaft and operatively connected to said apron conveyor for driving the same;
- c. a pair of axially spaced drive sprockets fixed to said main drive shaft;
- d. first and second axially spaced drive sprockets journalled for rotation about said second drive shaft, each of said driven sprockets being provided with a plurality of clutch dogs disposed about the inner sides thereof;
- e. a pair of drive chains drivingly interconnecting corresponding pairs of sprockets on said main drive shaft and said second drive shaft;
- f. a clutch collar keyed to said second drive shaft intermediately between said driven sprockets and moveably along the longitudinal axis thereof, said clutch collar having first and second sets of clutch dogs disposed on opposite sides thereof for selective engagement with the clutch dogs of an adjacent driven sprocket;
- g. means for moving said clutch collar from a first neutral position to a second position in which the first set of clutch dogs of said clutch collar are engaged with the clutch dogs of said first driven sprocket to yield a first input speed to said apron conveyor, and from said second position to a third position in which the second set of clutch dogs of said clutch collar are engaged with the clutch dogs of said second driven sprocket to yield a second input speed to said apron conveyor.

7. A manure spreader, as recited in claim 6, wherein a clutching device is interconnected between said main drive shaft and said spreading mechanism, and wherein said means for moving said clutch collar is operatively connected to said clutching device and includes means for maintaining said clutch collar in said third position while declutching said clutching device.

8. A manure spreader, as recited in claim 7, wherein said means for moving said clutch collar along said second drive shaft comprises:
- a. a yoke secured to said clutch collar;
- b. a support member disposed adjacent said spreader for supporting said yoke; and
- c. an actuating link fixed to said support member and extending therefrom for convenient operator access.

9. A manure spreader, as recited in claim 8, wherein said means for maintaining said clutch collar in said third position while declutching said clutching device includes stop means on said support structure and spring means interconnecting said support structure with said yoke.

10. A manure spreader, as recited in claim 9, wherein said support structure includes a generally U-shaped rod structure, and wherein said yoke is slideably confined along said U-shaped rod structure.

11. A manure spreader, as recited in claim 10, wherein the clutch dogs of said first driven sprocket are offset from the inner side thereof and radially spaced from said second drive shaft to form an internal gear structure, and wherein the first set of clutch dogs of said clutch collar are adapted to assume the space between said internal gear structure and said first driven sprocket to yield said neutral position, and further adapted to move inwardly therefrom for engagement with said clutch dogs of said first driven sprocket to yield said first input speed to said apron conveyor.

12. A manure spreader, as recited in claim 8, wherein said actuating link includes a quadrant having a series of notches formed therein and an exit structure formed adjacent each notch, and a pawl secured to a lever arm pivotally mounted adjacent said quadrant, said lever arm engageable with means for urging said lever arm laterally such that said pawl may be selectively disengaged from a respective notch and shifted laterally to said exiting structure for returning to initial position.

13. A manure spreader, as recited in claim 12, wherein said lever arm of said quadrant is interconnected with said yoke by a cable.

* * * * *